July 31, 1956 H. E. SLOAN ET AL 2,757,010
CHIP GUARD FOR CHUCKS
Filed Jan. 15, 1954

INVENTORS.
JEROME J. RUTHERFORD JR.
BY HARRY E. SLOAN.
Louis V. Lucia
ATTORNEY.

United States Patent Office 2,757,010
Patented July 31, 1956

2,757,010

CHIP GUARD FOR CHUCKS

Harry E. Sloan, Hartford, and Jerome J. Rutherford, Jr., Windsor, Conn., assignors to The Cushman Chuck Company, Hartford, Conn., a corporation of Connecticut Application January 15, 1954, Serial No. 404,174

7 Claims. (Cl. 279—112)

This invention relates to a chip guard for chucks and more particularly to a guard for preventing metal chips and the like from clogging the mechanism of a chuck.

The present invention is especially intended for chucks such as fully described in the co-pending application of Harry E. Sloan and Herbert W. Hickey, Serial No. 269,874, filed February 4, 1952.

It has been found that an accumulation of metal chips between the opposed sets of jaws in the slots of such chuck is very objectionable for the reason that it interferes with the movement of said jaws into clamping position upon a piece of work being chucked and thereby causes considerable inconvenience and loss of time in the operation of the chuck.

An object of the present invention, therefore, is to provide a guard which will prevent the chips from gathering between the chuck jaws and interfering with the operation of the chuck.

A further object of the invention is to provide a chip guard which will not interfere with the movement and operation of the jaws and which is self-adjustable to permit workpieces of different sizes to be clamped between said jaws.

A further object of this invention is to provide such a chip guard which is economical to construct and easy to assemble to the chuck jaws.

Further objects and advantages will be more clearly understood from the following description and from the accompanying drawings in which.

Figure 1:
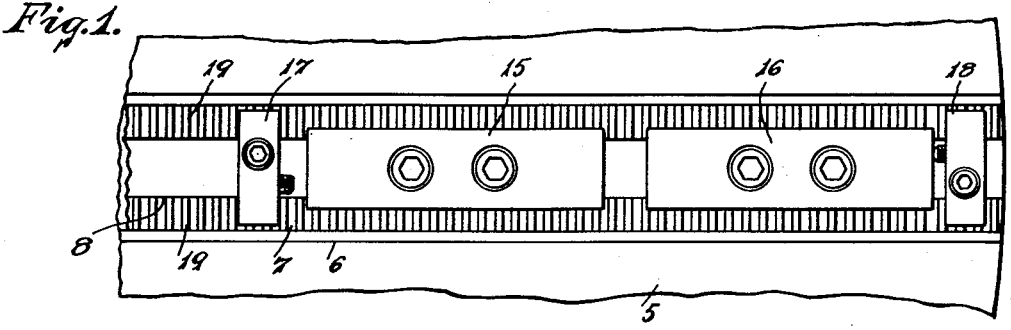
Fig. 1 is a plan view of a portion of a chuck, such as described in the said co-pending application, showing a pair of master jaws with our improved chip guard mounted therein.
Figure 2:
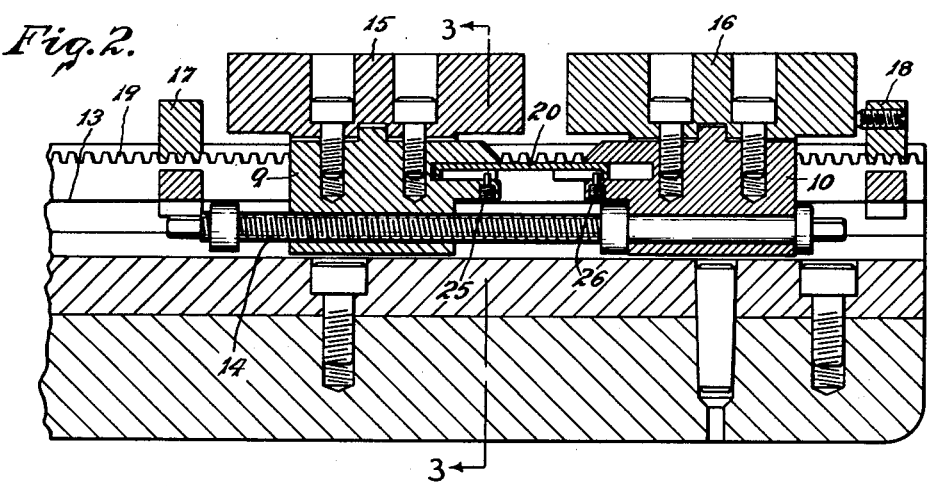
Fig. 2 is a side view thereof in central vertical section.
Figure 4:
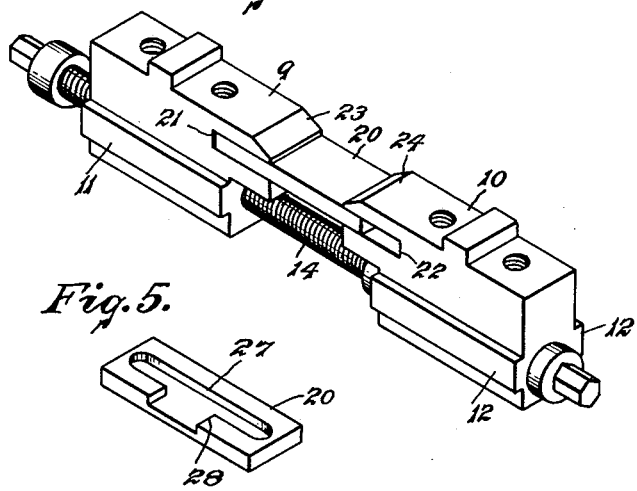
Fig. 4 is an isometric view of said pair of master jaws.

In the embodiment illustrated in the drawings, the numeral 5 denotes a portion of the base of the chuck which is provided with a radial slot 6 in which there is mounted a liner 7 in the form of an elongated bar; the said liner 7 having therein a slot 8 in which there is slidably contained a pair of opposed master jaws 9 and 10 each of which has laterally extending side ribs 11—11 and 12—12, respectively, that slidably fit in lateral slots 13—13 in the opposite sides of the slot 8.

The said jaws are connected by means of a suitable clamping screw 14 which is preferably rotatable in the jaw 10 and threaded to the jaw 9, as clearly illustrated in the drawings hereof and described in the said co-pending application.

Each of said jaws has mounted therein a top jaw, 15 and 16 respectively, which are especially formed to accommodate the particular shape or size of a workpiece to be clamped between the said jaws and each set of jaws is located upon the chuck in a predetermined position by means of stop blocks 17 and 18 which engage with opposed rows of teeth 19—19 at the opposite sides of the slot 8 and are clamped in position to limit longitudinal movement of the jaw set, as also fully described in the said co-pending application. In the use of said jaws, the clamping screw 14 is rotated by means of a suitable socket wrench so as to move the jaws relatively to each other to either clamp or unclamp a piece of work therebetween.

It has been found that metal chips cut from the workpiece would quickly accumulate in the slot 8, between said master jaws, to a degree which would interfere with the movement of the jaws toward their clamping position and the operation of the clamping screw. This invention, therefore, provides a chip guard in the form of a plate 20 which fits closely within the slot 8 over the clamping screw 14 and is slidably mounted within notches 21 and 22, respectively, in the master jaws 9 and 10 which notches are located in opposed projections 23 and 24, respectively, on said master jaws.

The said guard plate 20 fits closely and slidably within the slot 8 and is movably secured to the master jaws 9 and 10 by means of retaining screws 25 and 26, respectively, which have reduced ends that project into the notches 21 and 22 and extend into a longitudinal slot 27 in the bottom of the said guard plate in order to permit assembling of the guard plate to the jaws 9 and 10 without requiring disassembly of such jaws from the clamping screw 14. The said guard plate is provided with a notch 28 which leads into the slot 27 so that the said plate may be assembled to the master jaws, before the jaws are inserted into the slot 8, by simply drawing the said jaws together and slipping the guard plate into the notches 21 and 22 from the side of the jaws; whereupon the reduced ends of the screws 25 and 26 will pass through the notch 28 and enter the slot 27.

When the master jaws are inserted in the slot 28, the guard plate is retained in position crosswise by the side walls of said slot and the retaining screws 25 and 26 operate only to prevent lengthwise separation of the guard plate from the jaws.

Figure 3:
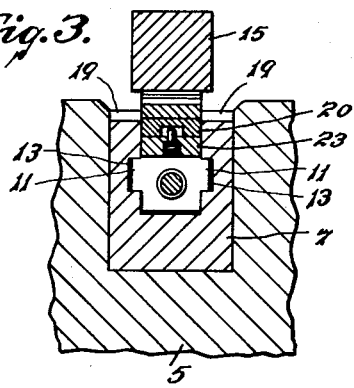
Fig. 3 is a sectional end view on line 3—3 of Fig. 2.
Figure 5:
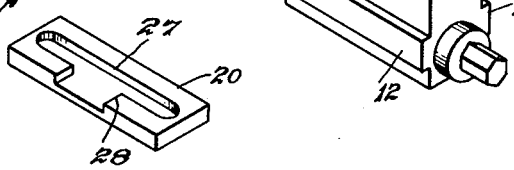
Fig. 5 is an isometric bottom view of the chip guard plate.

It will be clearly understood from the illustration of Fig. 3 that the said guard plate will close the slot 8, in the space between the master jaws 9 and 10, and thereby fully protect said space, and that portion of the clamping screw 14 which extends between the master jaws, from the accumulation of metal chips that are cut out of the workpiece directly above the said space and which have heretofore been found very difficult and time-consuming to remove due to the fact that the said chips often became compressed between the master jaws and under the said portion of the clamping screw.

We claim:

1. In a chuck including a base having a slot therein, a clamping jaw slidable in said slot and a clamping screw for drawing said jaw into and out of said clamping position; a chip guard including a plate fitting closely within said slot for preventing accumulation of chips in said slot adjacent to said jaw and slidably mounted in a notch in said jaw for permitting limited movement of the jaw independently of the said plate.

2. In a chuck including a base having a slot therein, a pair of jaws slidable in said slot and a clamping screw connecting said jaws for moving them toward and away from each other within said slots; a guard plate fitting closely within said slot between said jaws and slidably connected to said jaws for preventing accumulation of chips within said slot in the space between the said jaws.

3. In a chuck including a base having a radial slot therein, a pair of master jaws slidable in said slot and having opposed notches therein and a clamping screw connecting said jaws for moving them toward and away from each other; a guard plate fitting within said slot and extending across the space between the said jaws and slidably mounted in said opposed notches for preventing the entry of chips and the like into said slot between said jaws.

4. In a chuck including a base having a slot therein, a pair of opposed master jaws slidable in said slot and a clamping screw for drawing said jaws toward and away from each other; the said jaws having opposed projections with opposed notches therein; a guard plate fitting closely within said slot across the space between said jaws and mounted in said opposed notches for preventing the entry of chips and the like into said slot, the said plate having an elongated slot therein, and retaining screws threaded to said projections and extending into said slot for movably retaining the guard plate attached to the jaws.

5. In a chuck including a base having a slot therein, a pair of opposed jaws movable in said slot, and a clamping screw connecting said jaws and adapted to move them toward and away from each other; the said jaws having opposed projections disposed in said slot and extending over a portion of the screw between the jaws, the said opposed projections having opposed notches therein a guard plate closely fitting within said slot between said jaws and slidably mounted in said opposed notches, the said plate having an elongated slot in the bottom thereof, and retaining screws threaded into said projections and extending upwardly from the bottom thereof into said notches and into said slot in the guard plate for limiting the movement of said plate in said notches.

6. The subject matter set forth in claim 5 wherein the said plate has a notch in the bottom thereof extending from a side of the plate into the said elongated slot to permit assembling of the plate to the jaws by inserting it sidewise into the opposed notches when the jaws are removed from the slot in the base.

7. In a chuck having a slot therein, a pair of opposed master jaw members slidable in said slot and a clamping screw connecting said jaw members and adapted to move them toward and away from each other; a guard plate fitting closely within said slot between said jaws and movably mounted in opposed notches in the said jaw members, the said guard plate having abutments thereon, and means on said jaws engageable with said abutments for limiting the movement of the said guard plate within said notches to prevent disengagement of the guard plate from the jaws.

References Cited in the file of this patent

UNITED STATES PATENTS

| 2,366 | Hogle | Nov. 16, 1841 |
| 420,970 | Seaman | Feb. 11, 1890 |
| 617,113 | Marcille | Jan. 3, 1899 |
| 1,314,126 | Church | Aug. 26, 1919 |